(12) United States Patent
Brugger et al.

(10) Patent No.: US 11,698,386 B2
(45) Date of Patent: Jul. 11, 2023

(54) ENCODER DEVICE AND METHOD OF DETERMINING A KINEMATIC VALUE

(71) Applicant: SICK STEGMANN GMBH, Donaueschingen (DE)

(72) Inventors: Simon Brugger, Donaueschingen (DE); Christian Sellmer, Donaueschingen (DE); David Hopp, Donaueschingen (DE); Dominic Thomae, Donaueschingen (DE)

(73) Assignee: SICK AG, Waldkirch (DE)

( * ) Notice: Subject to any disclaimer, the term of this patent is extended or adjusted under 35 U.S.C. 154(b) by 245 days.

(21) Appl. No.: 17/118,782

(22) Filed: Dec. 11, 2020

(65) Prior Publication Data
US 2021/0182673 A1  Jun. 17, 2021

(30) Foreign Application Priority Data
Dec. 16, 2019  (EP) .................................... 19216601

(51) Int. Cl.
*G01P 15/00* (2006.01)
*G01P 3/00* (2006.01)
(Continued)

(52) U.S. Cl.
CPC .............. *G01P 15/003* (2013.01); *G01P 3/00* (2013.01); *G06N 3/04* (2013.01); *G06N 3/08* (2013.01); *G01D 5/3473* (2013.01)

(58) Field of Classification Search
USPC ........................................................ 702/163
See application file for complete search history.

(56) References Cited

U.S. PATENT DOCUMENTS 10,190,891 B1 *  1/2019  Rothkopf .................. G01P 3/50
11,409,304 B1 *  8/2022  Cai ............................ G06T 7/73
(Continued)

FOREIGN PATENT DOCUMENTS

CN        105043433 A     11/2015
CN        108801302 A     11/2018
(Continued)

OTHER PUBLICATIONS

European Search Report dated Jun. 30, 2020 issued in corresponding European Application No. 19216601.5.
(Continued)

*Primary Examiner* — Paul D Lee
(74) *Attorney, Agent, or Firm* — Nath, Goldberg & Meyer; Jerald L. Meyer; Morgan D. Rosenberg (57) ABSTRACT

An encoder device for determining a kinematic value of the movement of a first object relative to a second object is provided, wherein the encoder device comprises a standard associated with the first object and at least one scanning unit associated with the second object for producing at least one scanning signal by detection of the standard and a control and evaluation unit that is configured to determine the kinematic value from the scanning signal. The control and evaluation unit is here further configured to determine the kinematic value by an evaluation of the scanning signal using a method of machine learning, with the evaluation being trained with a plurality of scanning signals and associated kinematic values.

18 Claims, 5 Drawing Sheets

(51) Int. Cl.
  *G06N 3/04* (2023.01)
  *G06N 3/08* (2023.01)
  *G01D 5/347* (2006.01)

(56) References Cited

U.S. PATENT DOCUMENTS

| 2016/0224034 | A1* | 8/2016 | Kim ......................... G01P 21/02 |
| 2019/0034803 | A1* | 1/2019 | Gotou ..................... G06N 3/088 |
| 2019/0147340 | A1* | 5/2019 | Zhang .................. G06N 3/0454 706/25 |
| 2019/0244102 | A1  | 8/2019 | Harvey |

FOREIGN PATENT DOCUMENTS

| DE | 4409892 A1 | 9/1995 |
| DE | 102006042725 A1 | 3/2008 |
| DE | 102018001781 A1 | 9/2018 |
| DE | 102018006946 A1 | 12/2018 |
| DE | 102018005008 A1 | 1/2019 |
| DE | 102018005652 A1 | 1/2019 |
| DE | 102017220788 A1 | 5/2019 |
| EP | 0586999 A2 | 3/1994 |
| EP | 0586999 A3 | 3/1994 |
| EP | 0841539 A1 | 5/1998 |
| GB | 2562122 A | 11/2018 |
| JP | 201928515 A | 2/2019 |
| WO | 2015004472 A2 | 1/2015 |
| WO | 2017072683 A1 | 5/2017 |

OTHER PUBLICATIONS

Chen, et al.; "Photoelectric Encoder Error Compensation Research Based on PSO-BP Neural network"; Chinese Journal of Sensors and Actuators; vol. 30 No. 8 Aug. 2017; School of Mechanical Engineering, Liaoning Technical University, Fuxin Liaoning 123000 China with English summary on p. 12.

Ditthapron, et al., "Univeral Joint Feature Extraction for P300 EEG Classification Using Multi-Task Autoencoder", IEEE Access, vol. 7, pp. 68415-68428, 2019.

* cited by examiner

ENCODER DEVICE AND METHOD OF DETERMINING A KINEMATIC VALUE

The invention relates to an encoder device and to a method of determining a kinematic value.

A distinction between linear systems and rotary systems is made with encoder devices. A linear encoder determines a shift on an axis. A rotary encoder, angle of rotation sensor, or encoder, in contrast, serves the detection of an angle of rotation or of an angular position, for example of a shaft of a drive element. In this process, a standard is scanned in each case that is attached along the linear axis or to the shaft in a co-rotating manner. The standard generates an intensity modulation in a scanning sensor via the relative movement. There are frequently more than one scanned code tracks. Sin/cos encoders are thus widespread that provide two analog output signals with a position-dependent sinusoidal or cosinusoidal extent. The phase and the number of periods of these signals represent the sought position with a respective 90° offset.

Different technologies are used for the underlying sensor principles. Optical rotary encoders use a code disk having openings or reflection marks that serve as the code and that modulate the signal of a light transmitter so that a light receiver arranged in transmission or reflection receives position signals. The principle can also be transferred to linear encoders. With a magnetic encoder, the change of the magnetic field on the moving past of encoding permanent magnets is, for example, detected using a Hall sensor. Further known systems use standards and scans that work, for example, inductively, capacitively, or according to different modulation and scanning principles.

Encoder devices have to take account of different environmentally induced and mechanical influences at least for higher demands on accuracy. Complex calibrations and adjustment are required for this purpose that additionally require detailed knowledge of the system. Since the effects on the measurement are not always sufficiently known, a complete correction is often not even possible by a calibration.

The conventional evaluation is based on the utilization of mathematical relationships such as an arctangent function in the case of sin/cos code tracks. These relationships cannot, however, easily be derived and evaluated depending on the encoding. Specifically, a complex system architecture is then required to acquire, compile, interpolate, correct, and so forth the different partial pieces of information, for example of an absolute track, an incremental track.

It is therefore the object of the invention to improve the evaluation of an encoder device.

This object is satisfied by an encoder device and by a method of determining a kinematic value in accordance with the subject matter defined in the respective independent claim. The encoder device can determine a kinematic value of a linear movement or of a rotary movement depending on the embodiment. In the latter case, the encoder device is also called a rotary encoder, an angle of rotation sensor, or an encoder; on a use in a servomotor, also a motor feedback system. The kinematic value preferably comprises the longitudinal position or the angular position, but can also be a speed and/or an acceleration, either as a complementary additional measurement value or as an aid for a more accurate position determination.

A standard is associated with the one object and a scanning unit is associated with the other object to produce at least one scanning signal by detection of the standard that is in relative motion. The standard has a structuring or encoding that characterizes the respective position. In this respect, one or more absolute tracks and/or incremental tracks are possible. At least one scanning unit generates at least one scanning signal from the standard with the relative motion. A plurality of scanning signals are produced by scanning a plurality of tracks and/or by scanning with a longitudinal or angular offset. A plurality of scanning units are then provided for this purpose or one scanning unit provides a plurality of or all the scans. The structuring or encoding of the standard is reflected in the respective scanning signal. The sensor principle of the scanning unit and the associated properties of the standard can be optical, magnetic, inductive, or capacitive or can be based on a different physical principle.

A control and evaluation unit determines the kinematic value from the at least one scanning signal The control and evaluation unit is preferably a part of the encoder device in the sense of a unit installed therein. It is, however, also conceivable to provide computing or storage capacities from the outside, in particular from a connected controller, a computer of any desired design, or a network, in particular a cloud.

The invention starts from the basic idea of determining the kinematic value with the aid of a method of machine learning. An evaluation of the scanning signal is carried out using a method of machine learning for this purpose. The evaluation is trained with a plurality of scanning signals with respect to which the respective associated kinematic value is specified. With simulated training data, the suitable kinematic value is known as a specification; otherwise, it is measured using a different sensor, for example. Such a sensor can be of a very high grade and therefore precise or can use a complex measurement principle or aids are provided such as calibration targets and the like. This is all only required during the training so that marginal conditions such as costs and installation space play a subordinate role, in contrast to the actual encoder device and its later operation.

The invention has the advantage that a flexible evaluation that can be used in a number of application situations is provided for an encoder device. The evaluation works without in-depth system knowledge. Tolerances are taken into account by the machine learning; an additional calibration or adjustment is not necessary. At the same time, the robustness with respect to any influences is increased that do not have to be completely understood and that have to be mastered in the same way as the system itself. In this respect, the evaluation can be prepared for specific influences by a direct selection of corresponding training data. The encoder device itself can continue to have a comparatively simple and inexpensive design in that the training is assisted or taken over by external computing and storage capacities.

The control and evaluation unit preferably has a deep neural network. A deep neural network is defined as an artificial neural network having a plurality of hidden layers. Deep neural networks are particularly efficient, easily trainable, and enable a reliable determination of the kinematic value with low measurement error. Alternatively to deep neural networks, simple neural networks or other methods of machine learning that are known per se, but have not previously been used for encoder devices are conceivable such as Random Forest, K-means, and others.

The architecture of the deep neural network preferably has an at least partially predefined architecture, in particular a predefined number of layers and/or neurons per layer. Due to the predefinition of the architecture, only the weightings of the connections have to be located during the training, whereby the complexity is reduced. In addition, with preknowledge of the family of encoder devices that specifically have to be trained, it is possible to select a particularly suitable architecture that is optimized according to criteria such as training duration, number of required training data records and training repetitions, and accuracy. Alternatively, the training can also include the determination of the specific architecture. As a rule, this increases the training duration, but in turn produces better results, particularly when no prior knowledge of an optimum architecture is present.

The encoder device preferably has a plurality of scanning units having different sensor principles. This then naturally correspondingly applies to the standard that cooperates in a suitable manner with the scanning units and comprises, for example, optical tracks for an optical scan or magnetic tracks for a Hall sensor. The possibility of a presence of a plurality of scanning units or comparably of one scanning unit that can generate a plurality of scanning signals has already been discussed. In this embodiment, it is a question of combining different sensor principles, for example optical and magnetic scanning. The increases the feature space and thus enables a more robust and more precise determination of the kinematic value. In addition, the reliability is improved by diversity and this can in particular be significant for a use in safety engineering. Conventionally, scanning signals of different sensor principles as a rule also have to be differently evaluated. For a method of machine learning, it is a case of additional scanning signals for which preferably special additional steps are not required either in training or in operation. The additional information due to diversity is then rather used implicitly.

At least one scanning unit is preferably configured for a sensor principle that directly produces a piece of speed and/or acceleration information. These kinematic values can alternatively be acquired by a time derivation of the position signals, but the measurement errors increase dramatically in so doing under certain circumstances. A direct measurement can therefore be more accurate and at least opens up a new feature space. For example, a speed is acquired by an inductive sensor principle of the scanning unit. The standard is in turn suitable to be designed for the sensor principle of the associated scanning unit. The measurement of an acceleration takes place, for example, by an inertia principle (IMU, inertial measurement unit).

The standard is preferably configured for the generation of a non-periodic pattern. This relates to the relevant measurement path; the necessary repetition after 360° in a rotary encoder is not understood as periodic in this connection. A non-periodic pattern is in particular not described by a simple mathematical relationship such as a sine or cosine or a corresponding rectangular signal; and nor does it comprise regular incremental structures. Complex and multidimensional patterns can also be evaluated by machine learning that would only be able to grasped with difficulty or not at all by an analytical method. In a certain manner, tolerances and inaccuracies of the standard or of the scan, such as flanks, ripples, and the like, are not periodic patterns in this sense. In a conventional evaluation, this would only cause additional measurement errors. A method of machine teaching preferably also utilizes such differences provided that they are at least partially recurring. The standard is, however, preferably formed in a planned manner with the non-periodic pattern.

The kinematic value preferably comprises a rotary position or a translatory offset of the two objects with respect to one another. Acquiring such a piece of positioning information is the classical object of an encoder device and is preferably determined as the sought kinematic value or as one of the sought kinematic values. Depending on whether it is a translatory or a rotary system, a rotary encoder or a longitudinal measurement device or a longitudinal position system is produced.

The kinematic value preferably comprises a speed and/or an acceleration. Such kinematic values are detected in addition to a position or instead of it. There are therefore embodiments that determine position, speed, and acceleration or pairs or individual ones of these kinematic values. The determination of speed or acceleration takes place by derivation and/or by a direction measurement using a suitable sensor principle. It is conceivable not to determine the speed or the acceleration as a separate target value, but to validate a different target value or to detect it more accurately, for example to measure the position by integration of the speed.

The control and evaluation unit is preferably configured for an advance determination of a rough estimate of the kinematic value, in particular using a method without machine learning. In this embodiment, the actual evaluation for determining the kinematic value is restricted in advance by the method of machine learning and is thus less complex. The rough estimate preferably uses conventional means without machine learning even though a preceding rough estimate with machine training would be conceivable. A separate rough estimate unit is then trained for this purpose using a method of machine training. The rough estimate can take place from at least one separate track of the standard or from the at least one track that is also used for the evaluation for the exact determination of the kinematic value.

The control and evaluation unit is preferably configured for a training phase in which the encoder device is exposed to different known movement scenarios with known location, speed, and/or acceleration profiles. Scanning signals are acquired from the movement scenarios with respect to which the associated kinematic values are known and can thus be trained. The movement scenarios should represent the later operating conditions and the training can be improved and the training duration shortened by a suitable design and selection of movement scenarios.

The evaluation is preferably trained while varying the environmental conditions and/or mechanical influences, in particular varying the temperature, humidity, shock load, and/or vibration. The evaluation in operation thereby becomes robust with respect to such variations. Unlike with a conventional evaluation, no special models or the like are necessary for this from which suitable compensation calculations are derived. As long as the variations in training at least tolerably represent the later influences, the method of machine learning will take this into account. The conditions become representative in a very simple manner in that the training takes place directly at the later deployment site. Alternatively, artificial variations are also conceivable, either actually by heating and humidifying or by shocks or by a simulation of heating and moisture influences and movements, with the latter again at least requiring a certain amount of system knowledge.

The movement is preferably a rotary movement, with the evaluation being trained while varying the eccentricity, radial runout, and/or different rotary supports. In the case of rotary encoders, there are specific influencing values of which the most important are listed by way of example. A support enables the rotary movement of the two objects with respect to one another. Variations in eccentricity, radial runout, and individual properties of the support itself, for example of the ball bearing used, thereby result. The evaluation also takes these influences into account by means of a method of machine training provided they are varied accordingly in training. This can again be particularly simply achieved by individual training of the specific installed encoder device.

A partially trained evaluation that is trained for a class of encoder devices is preferably specified for the control and evaluation unit. In particular the above-named general influences by the environment such as the temperature, humidity, shock, or vibration also have a similar effect on encoder devices that are similar to one another. At least some of the training can thereby take place in a general manner. This training result is uploaded to a specific encoder device; the weightings of a neural network are accordingly occupied in advance, for example. Under certain circumstances, the encoder device can already work without further training by such a generally trained method of machine learning.

The control and evaluation unit is preferably configured to subsequently train the partially trained evaluation individually. Some influences are not general, not even among encoder devices of the same design. Such differences can be taken into account by an individual training. This can take place in final production where it is possible to provide controlled conditions and precise specifications of the correct kinematic value by a superior sensor system as part of the training. A training in the installed position or on site in the later application situation is equally conceivable.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in.

Figure 1:
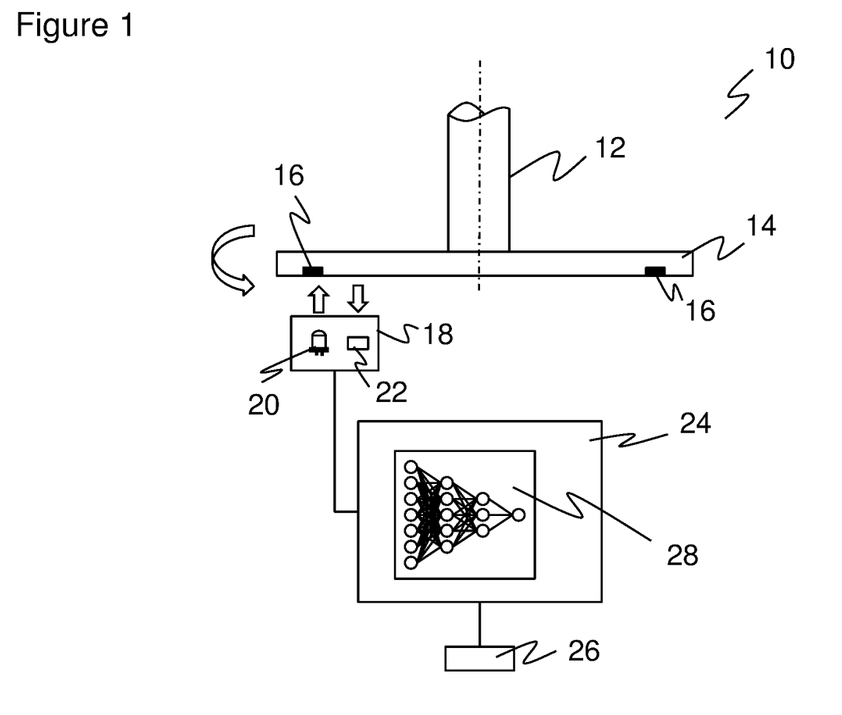
FIG. 1 a schematic representation of a rotary encoder.

FIG. 1 shows a schematic representation of an encoder device 10 that is configured as a rotary encoder. The function of the encoder device 10 is to determine kinematic values of the rotary movement of a shaft 12, in particular its rotary position. In the embodiment shown as an optical encoder, the encoder device 10 has a code disk rotating with the shaft 12 as a standard 14 and there is a code track 16 on the standard 14. The code track 16 can be very simple as in the case of a regular incremental pattern or gear or can include any conceivable, also very complex, code.

A scanning unit 18 having a light source 20 and a light receiver 22 scans the code track 16 and generates a corresponding scanning signal. To achieve high measurement accuracy, the scanning signal should have a resolution that is as high as possible and that should enable a distinction of a plurality of steps. In practice, a plurality of scanning units 18 are typically provided that scan a plurality of code tracks 16 and/or one respective code track 16 at a different angle offset. It is also possible that one scanning unit 18 already detects a plurality of code tracks 16, for example by a light receiver 22 having a plurality of light reception elements. A plurality of scanning signals can thus be generated in a different manner instead of only one scanning signal. A mechanical rotation of 360° can comprise a plurality of similar periods of the same or of different lengths. Alternatively, for a better distinguishing ability, no repeating sections are provided sector-wise or over the total 360°, either already within a single code track or at least in their totality.

A control and evaluation unit 24 evaluates the scanning signals to determine the desired angle signals and/or other kinematic values of the rotational movement of the shaft 12. The angular position, angle speed, and/or angle acceleration is provided at an output 26. This evaluation takes place by pattern recognition in the scanning signals using a method of machine learning that is shown as a representative by a deep neural network 28. Alternative methods of machine learning are conceivable such as Random Forest, but the further description is made for the example of the neural network 28.

The control and evaluation unit 24 can be at least partially implemented outside the encoder device 10 to provide additional computing and storage capacity, for example from a connected processor or from a cloud. This in particular applies to the training phase for the neural network 28 that is particularly data and processing intensive.

The representation of the encoder device 10 in FIG. 1 is very schematic. How the scanning signals are specifically generated is of secondary importance for the invention. The embodiment of the scanning unit 18 in FIG. 1 is therefore kept very simple and could, for example, equally work in a transmission process instead of in a reflected light process. A further alternative example is a magnetic standard 14 having a scanning unit 18 that has at least one Hall sensor. Other physical measurement principles having corresponding combinations of standard 14 and suitable scanning unit 18 are possible, in particular an inductive or capacitive detection. In an embodiment, a plurality of sensor principles are combined with one another, for example optical and magnetic code tracks 16 on one or more standards 14 using corresponding scanning units 18. Absolute and incremental encoder devices 10 are covered by the invention and the encoder device 10 can comprise any desired interfaces and output formats.

Figure 2:
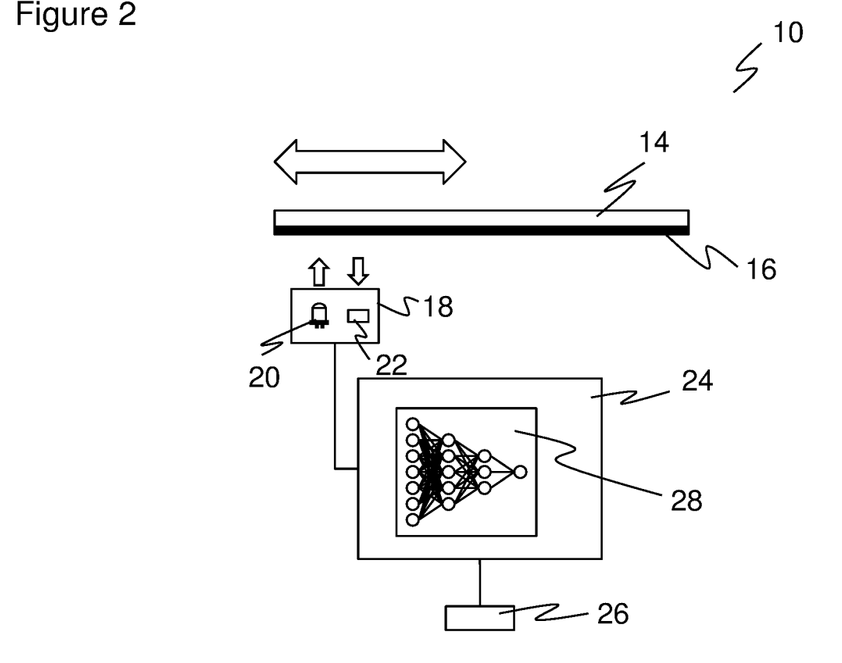
FIG. 2 a schematic representation of an encoder device for a longitudinal position measurement.

FIG. 2 shows a schematic representation of an encoder device 10 that is now configured for a linear movement instead of for a rotary movement. The standard 14 is elongated in this embodiment and the scanning unit 18 moves in a translatory manner in the direction of the longitudinal extent. A longitudinal position and/or a speed or acceleration in a longitudinal direction are thus detected as kinematic values. The code track 16 can have a periodicity, for example with repetition after one meter, or can be different everywhere, at least in interaction of a plurality of code tracks 16.

No distinction is made between a rotary system in accordance with FIG. 1 and a translatory or linear system in accordance with FIG. 2 in the following. A scanning signal is produced in each case that is evaluated by a method of machine learning to determine the sought kinematic values.

Figure 3:
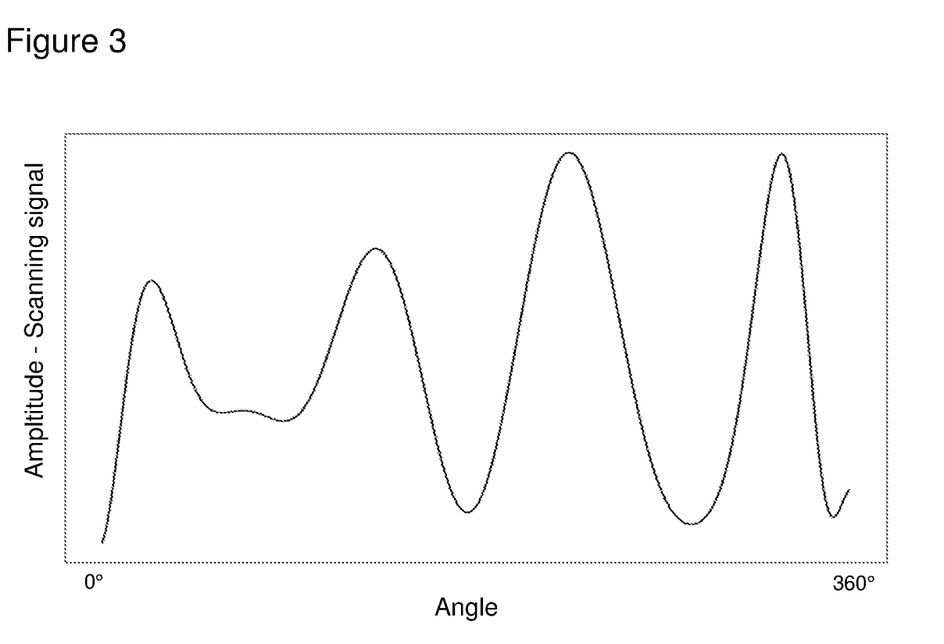
FIG. 3 a representation of an exemplary scanning signal of a rotary encoder.

FIG. 3 shows a scanning signal of an encoder device 10 configured as a rotary encoder over a rotation of 360°. The greater the number of data points and the accuracy of the amplitude resolution, for example ten bits, the more exact the angle can be determined, but also the higher the hardware and evaluation effort is. A scanning signal is generated by a corresponding design of the standard 14 or of the code track 16 that, in contrast to a simple mathematical function such as a sine or a cosine, does not have any periodic repetitions and thus provides as many indications as possible to draw a conclusion on the angle. The specific extent of the scanning signal, however, is purely by way of example.

Figure 4:
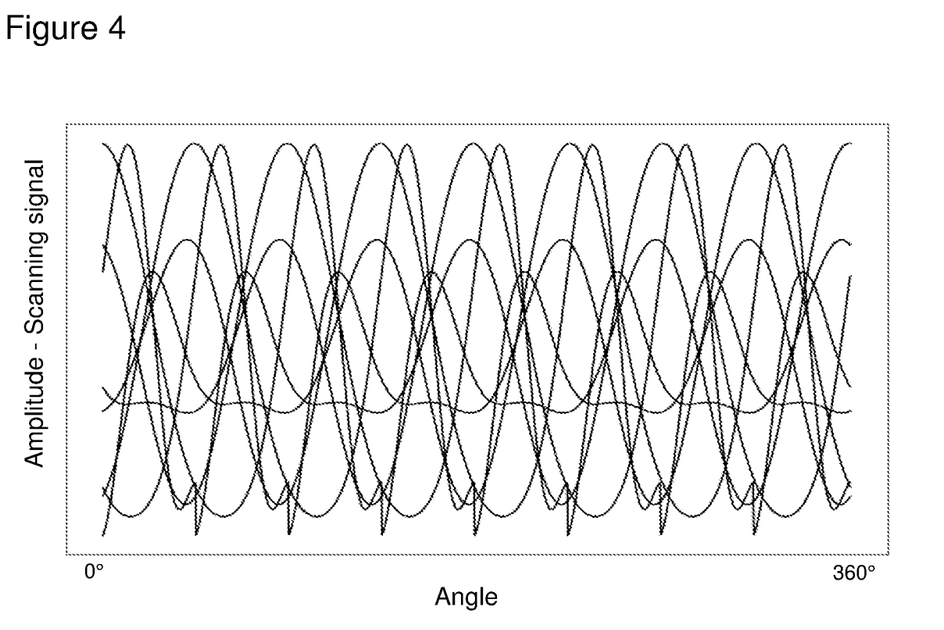
FIG. 4 a representation of a plurality of superposed scanning signals of a plurality of scanning units of a rotary encoder.

FIG. 4 shows a superposition of scanning signals offset in angle from one another corresponding to that of FIG. 3. The respective scanning values with a respective fixed angle allow a conclusion on the associated angle, with this also being unambiguous with a skillful design of the scanning signals themselves and of the mutual offset.

These associations could now be restored analytically or using a lookup table by a deterministic evaluation. However, this means an effort to detect the mathematical relationships or to set up the lookup table. Separate considerations that provide an appropriate solution for analytical methods or lookup tables have to be made for every design of the encoder device 10. In addition, the evaluation is susceptible to variations of the scanning signal that always occur in real operation and the effects are unmanageable and at best only able to be managed by an intensive examination of the respective design of the encoder device 10.

In accordance with the invention, a method of machine learning is therefore used that, as already explained, will be described for the example of the neural network 28. Which sensor principle the scanning signals are produced with and whether the respective patterns in their extent are due to the design, differences of the individual encoder device 10 from this design, or current influences do not play any role for the neural network 28. The neural network 28 will rather learn those scanning signals that have been offered to it during the training and will locate the kinematic values in accordance with this model in later operation. This kind of training and of evaluation is possible and robust universally over different encoder devices 10 of the same family or even of different designs. In this respect, individual properties of a respective encoder device 10 can indeed be taken into consideration by training with its scanning signals and the influences of the operating site in the target application can also be included by at least partial training on site in the installed position.

Figure 5:
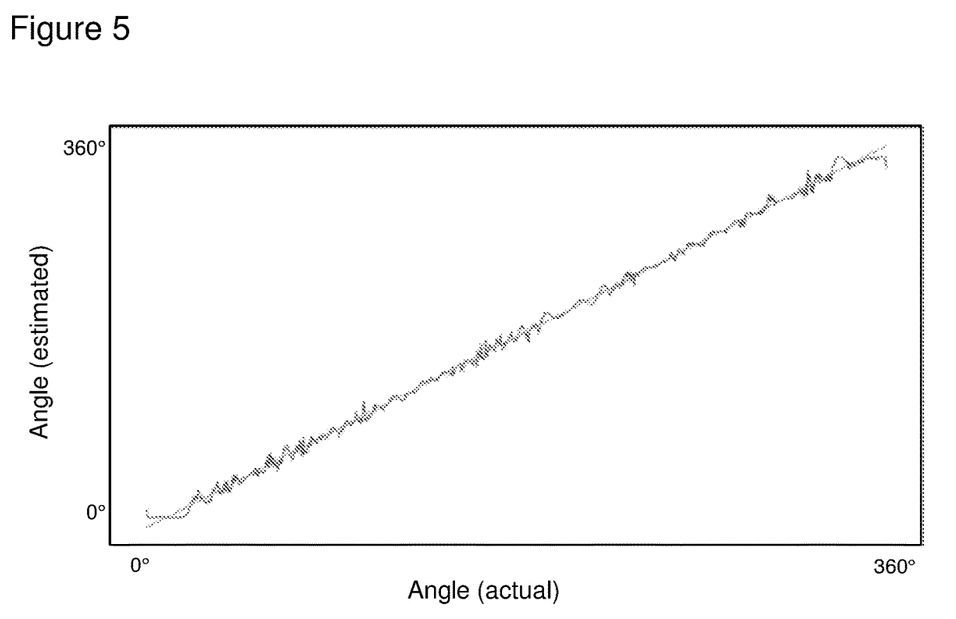
FIG. 5 a representation of an angle estimate of a neural network for a rotary encoder.
Figure 6:
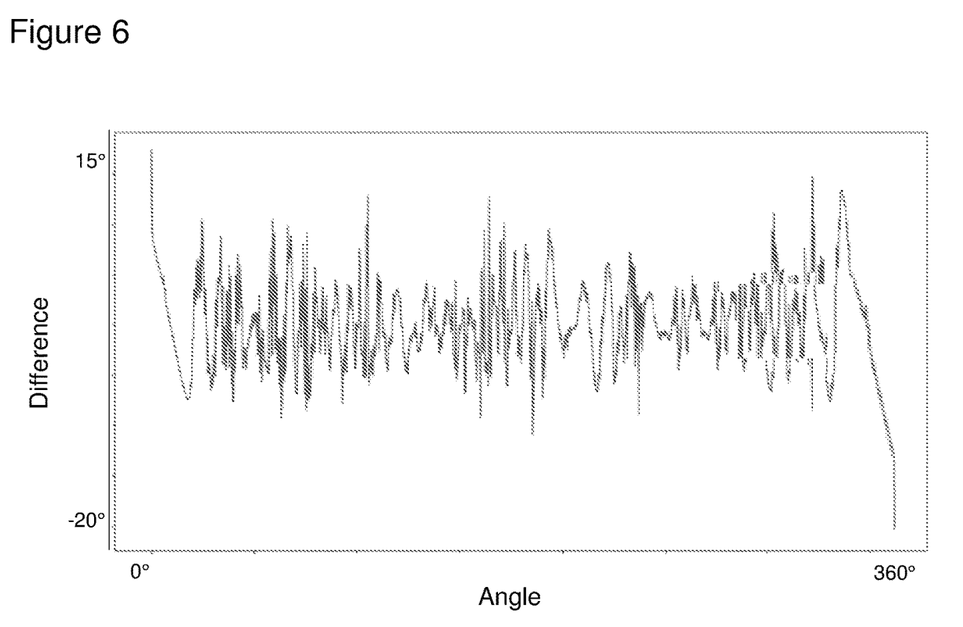
FIG. 6 a representation of the angle error of the angle estimate in accordance with FIG. 5.

FIG. 5 shows an evaluation of a plurality of scanning signals by a neural network 28, that is the angle determined by the neural network 28 in dependence on the actual angle. FIG. 6 shows the associated angle error in comparison with an ideal angle measurement. The neural network 28 was taught with 50,000 repetitions. The underlying scanning signals correspond in principle to those of FIG. 4; specifically, however, scanning signals of a different exemplary system were used.

Figure 7:
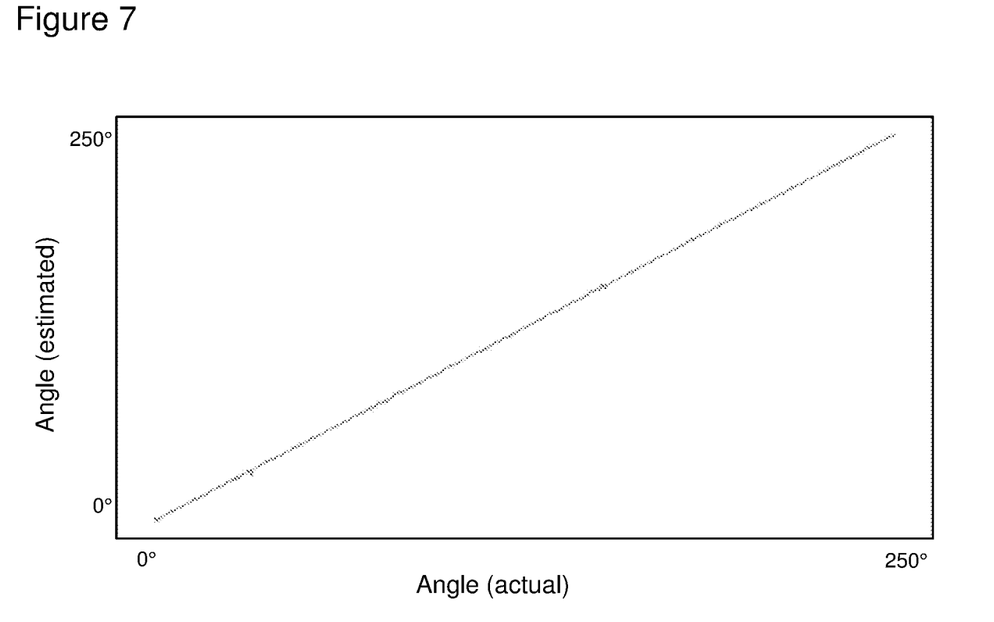
FIG. 7 a representation of an angle estimate similar to FIG. 5, but now with a longer training of the neural network.
Figure 8:
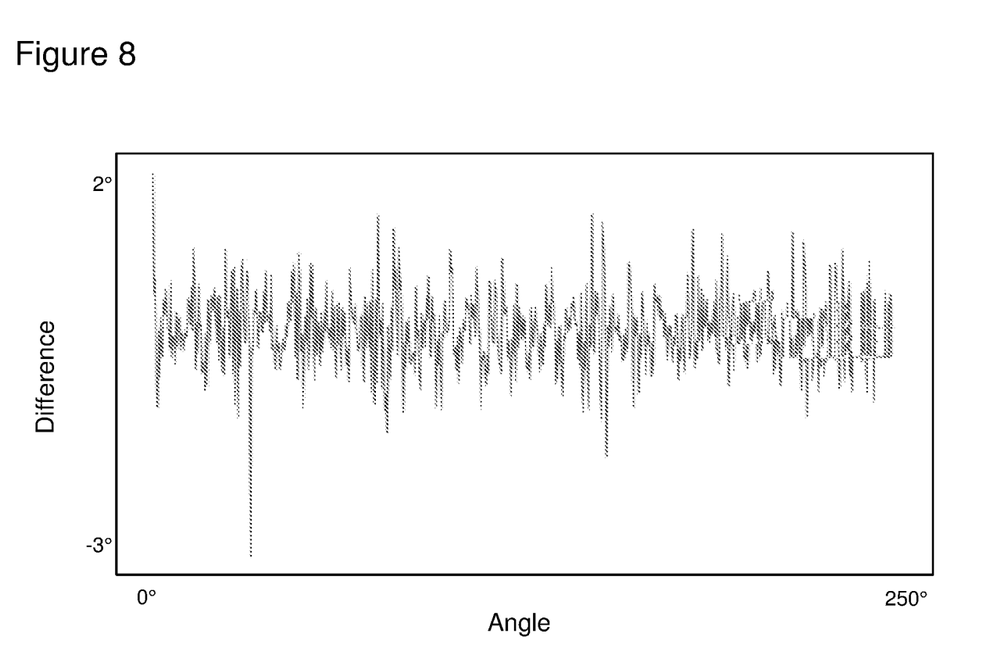
FIG. 8 a representation of the angle error of the angle estimate in accordance with FIG. 7.

FIGS. 7 and 8 show for comparison purposes the evaluation of the neural network 28 or the angle error after training with 100,000 repetitions, with the angular range being limited to 250°. The angle error, that is shown in a considerably finer scale in FIG. 8 than in FIG. 6, is very clearly reduced by the longer training and shows that higher measurement accuracies can be reached over the training duration.

Figure 9:
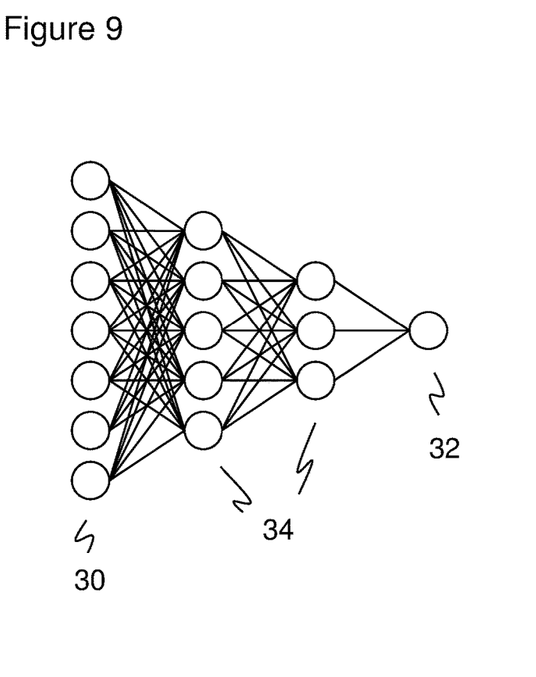
FIG. 9 a schematic representation of a neural network.

FIG. 9 very schematically shows an example architecture of a deep neural network 28 having an inlet layer 30, an outlet layer 32, and a plurality of hidden intermediate layers 34, two here. As illustrated in FIG. 8, an accuracy of approximately 1° can be achieved with this predefined architecture with a few intermediate layers 34 with scanning signals having a resolution of ten bits by more than 100,000 training repetitions. Accuracies <1°, for example 120°, can also be achieved by better resolution of the scanning signals of, for example, twenty bits and an even longer training.

Figure 10:
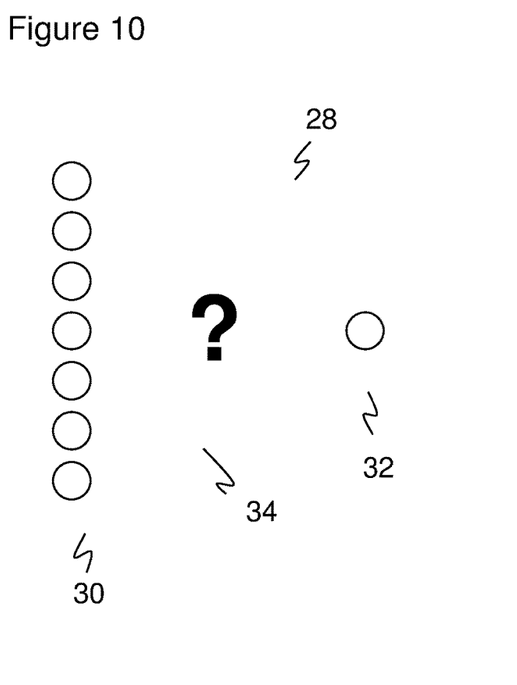
FIG. 10 a schematic representation of a neural network with an architecture not fixed in advance.

FIG. 10 illustrates a further deep neural network 28 in which the architecture is at least partially not fixed. This can be done as part of the training or an optimized architecture is sought manually. Improvements of the evaluation are again possible by the neural network 28 using such measures.

An encoder device 10 typically determines an angular position or location position. Some embodiments instead or additionally output speed and/or acceleration. This can be acquired analytically by derivation from the position information of the neural network 28 or the neural network outputs it itself. To achieve even better measurement results here, it is conceivable to select a sensor principle that measures a speed or acceleration. A speed-proportional signal is, for example, generated by an inductive sensor principle. There are likewise measurement methods, for instance inertia sensors (IMU, inertial measurement unit), for the direct measurement of the acceleration. A combination of a plurality of sensor principles that once measure the position and once the speed, for example, is particularly advantageous.

In a further advantageous embodiment, a rough estimate precedes the actual evaluation of the neural network 28. A code track 16 is, for example, evaluated in advance using a classical measurement method and a rough estimate is thus already obtained. The neural network 28 then evaluates this scanning signal again and/or further scanning signals to improve the rough estimate. In an example, the rough estimate is based on a digital scanning signal or on a scanning signal having a resolution of a few bits, while the neural network 28 subsequently evaluates the analog scanning signal or the scanning signal sampled at a greater bit depth. A plurality of code tracks 16 are provided in In another example. The rough estimate uses one of these code tracks 16 with a random code (PRC, pseudo-random code) and the neural network 28 evaluates scanning signals of a different code track 16 with a periodic or non-periodic signal or an analog version of the scanning signal of the code track 16 with the random code. It is conceivable that the neural network 28 or a different process of machine learning including a further neural network carries out the rough estimate.

In practical use, an encoder device 10 is exposed to a large number of environmental influences. They include environmental conditions such as the temperature, humidity, and mechanical influences such as shock, vibration, or additional forces and torques. Such influences can be taken into consideration in the training. One possibility is to vary the scanning signals used for the teaching by simulation corresponding to the environmental influences. An alternative or complementary procedure is a teaching under variable environmental influences in a typical application situation, for example, as part of the end production or even directly at the layer deployment site.

In an embodiment, the neural network 28 is already pre-trained by such influence factors over a large number of encoder devices 10. A standard network is trained for this purpose that is then uploaded as the starting point instead of a completely untrained neural network 28. This is then preferably followed by an individual training of a respective encoder device 10. The neural network 28 therefore does not start with any desired weightings in an individual training, but with those of the pre-training so that an improved starting state with respect to the various influence factors is already achieved. In the individual training, the encoder device 10 is preferably exposed to optimized evaluation scenarios having specific location, speed, and/or acceleration profiles. Reference measurements have to take place with fewer sensors under certain circumstances to determine the actual kinematic parameters. Data from the individual training and from operation can be used to further improve training scenarios or the standard network in the course of the time for encoder devices 10 to be taught in future.

There are specific characteristics with a rotary encoder such as eccentricity, radius runout, or ball bearing properties. They can be taken into account in that training data are varied by a spectrum of these characteristics, optionally in combination with variations by environmental influences.

Figure 11:
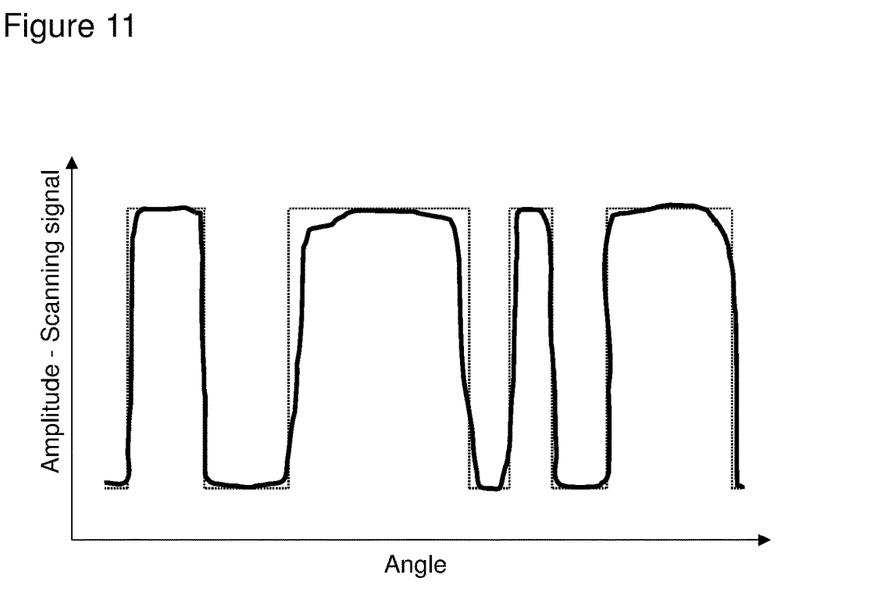
FIG. 11 a schematic representation of an ideal scanning signal and of a real scanning signal.

FIG. 11 shows the comparison of an ideal scanning signal and an actual scanning signal. The actual scanning signal will never correspond to the ideal scanning signal in reality, but rather have various flanks, transitions, ripples, and the like. Such differences are disadvantageous for a conventional method since they produce additional errors. To the extent the differences are at least partially reproducible, they only represent further structures for a method of machine learning that equally contribute to an improved evaluation as intentionally introduced structures.

The invention claimed is:

1. An encoder device for determining a kinematic value of the movement of a first object relative to a second object, wherein the encoder device comprises:
    a standard associated with the first object;
    at least one scanning unit associated with the second object for producing at least one scanning signal by detection of the standard; and
    a control and evaluation unit that is configured to determine the kinematic value from the at least one scanning signal,
    wherein the control and evaluation unit is further configured to determine the kinematic value by an evaluation of the at least one scanning signal using a method of machine learning, with the method of machine learning being pre-trained with a plurality of scanning signals and associated kinematic values.

2. The encoder device in accordance with claim 1, wherein the control and evaluation unit has a deep neural network.

3. The encoder device in accordance with claim 2, wherein an architecture of the deep neural network has an at least partially predefined architecture.

4. The encoder device in accordance with claim 3, wherein the architecture of the deep neural network has a predefined number of layers and/or neurons per layer.

5. The encoder device in accordance with claim 1, wherein the at least one scanning unit comprises a plurality of scanning units using different sensor principles.

6. The encoder device in accordance with claim 1, wherein the at least one scanning unit is configured for a sensor principle that directly produces a piece of speed and/or acceleration information.

7. The encoder device in accordance with claim 1, wherein the standard is configured for the generation of a non-periodic pattern.

8. The encoder device in accordance with claim 1, wherein the kinematic value comprises one of a rotary position and a translatory offset of the first and second objects from one another.

9. The encoder device in accordance with claim 1, wherein the kinematic value comprises at least one of a speed and an acceleration.

10. The encoder device in accordance with claim 1, wherein the control and evaluation unit is configured for an advance determination of a rough estimate of the kinematic value.

11. The encoder device in accordance with claim 1, wherein the control and evaluation unit is configured for an advance determination of a rough estimate of the kinematic value using a method without machine learning.

12. The encoder device in accordance with claim 1, wherein the control and evaluation unit is configured for a training phase in which the encoder device is exposed to different known movement scenarios with known location, speed, and/or acceleration profiles.

13. The encoder device in accordance with claim 1, wherein the evaluation is trained while varying environmental conditions and/or mechanical influences.

14. The encoder device in accordance with claim 1, wherein the evaluation is trained while varying at least one of temperature, humidity, shock load, and vibration.

15. The encoder device in accordance with claim 1, wherein the movement is a rotary movement and wherein the evaluation is trained while varying eccentricity, radial runout, and/or different rotary supports.

16. The encoder device in accordance with claim 1, wherein a partially trained evaluation that is trained for a class of encoder devices is specified for the control and evaluation unit.

17. The encoder device in accordance with claim 16, wherein the control and evaluation unit is configured to subsequently train the partially trained evaluation individually.

18. A method of determining a kinematic value of the movement of a first object relative to a second object, wherein a standard is associated with the first object and at least one scanning unit is associated with the second object, the method comprising:
    producing at least one scanning signal by detection of the standard using the at least one scanning unit; and
    evaluating the at least one scanning signal to determine the kinematic value therefrom, wherein the kinematic value is determined by an evaluation of the at least one scanning signal using a method of machine learning, with the method of machine learning being pre-trained with a plurality of scanning signals and associated kinematic values.

* * * * *